United States Patent Office 2,947,665
Patented Aug. 2, 1960

2,947,665

MICROBIOLOGICAL PREPARATION OF MESO-TARTARIC ACID

Jackson W. Foster, 2112 Highgrove Terrace, Austin, Tex.

No Drawing. Filed May 7, 1956, Ser. No. 582,954

4 Claims. (Cl. 195—36)

My invention relates to the microbiological conversion of trans-epoxysuccinic acid to meso-tartaric acid as represented by the following equation:

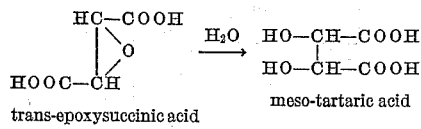

trans-epoxysuccinic acid → meso-tartaric acid

The conversion is substantially quantitative and is effected either by the surface or submerged culture of a variety of organisms of the subphylum Fungi. The conversion is specific to the trans isomers of epoxysuccinic acid and invariably produces meso-tartaric acid. Cis-epoxysuccinic acid is not affected and neither $d$- nor $l$-tartaric acid are obtained in significant quantities under the conditions employed. The product of the new microbial conversion has many uses as, for example, in baking and jelly powders, in silvering glass, in galvanoplastics, for coloring metals, dyeing and printing fabrics, purifying yeast, in photography, for tanning, for the manufacture of tartrates and as an analytical reagent. So far as I am aware I am the first to discover a microbiological method for producing meso-tartaric acid.

Trans-epoxysuccinic acid for use in my invention can be either one of the optical isomers or a racemic mixture. I prefer to use trans-$l$-epoxysuccinic acid since it can be easily and inexpensively prepared by the fermentation of an aqueous medium containing glucose or ethanol as the sole source of carbon. I have found that *Aspergillus fumigatus* No. 12, a fungus isolated from soil, produces satisfactory yields of trans-$l$-epoxysuccinic acid. Other organisms which ferment carbohydrates to produce the desired trans-$l$ acid include *Aspergillus fumigatus* NRRL 1986, *Paecilomyces varioti* NRRL 1282 and *Penicillium vermiculatum* NRRL 1009. A detailed discussion of the preparation of trans-$l$-epoxysuccinic acid appears in "Production of Trans-$l$-epoxysuccinic Acid by Fungi and its Microbiological Conversion to Meso-tartaric Acid," Martin and Foster, Journal of Bacteriology, 70, 405–414 (1955), of which I am a co-author.

The organisms mentioned above and all others I have employed in my invention can be cultivated in a basal synthetic medium having the following composition:

TABLE I

Ingredient:
| | |
|---|---|
| $KH_2PO_4$ | grams 3 |
| $Na_2HPO_4$ | do 6 |
| $NH_4Cl$ | do 1 |
| $MgSO_4 \cdot 7H_2O$ | do 0.12 |
| Distilled water | liters 1 |

For growth of fungi 5 mg. of $ZnSO_4 \cdot 5H_2O$, 10 mg. of $FeSO_4$ and either 30 g. of glucose or 20 g. of ethanol are added per liter. For growth of bacteria, 1 g. of sodium trans-$l$- or $dl$-epoxysuccinate is added per liter of medium as the sole source of carbon. Slants for carrying stocks are prepared by the addition of 15 g. of agar per liter of medium. Liquid cultures are suitably incubated at 30° C. on a reciprocating shaking machine.

The organisms of the subphylum Fungi which effect the microbiological conversion of trans-epoxysuccinic acid to meso-tartaric acid can be isolated from soil by conventional enrichment and selective culture procedures employing the mold product trans-$l$-epoxysuccinic acid as the sole source of carbon and energy. Selection of the organisms capable of effecting the desired conversion is accomplished by growing the organism to be tested on trans-epoxysuccinic acid in the presence of an amount of calcium ion in excess of the stoichiometric equivalent of the theoretical yield of tartaric acid. The formation of a precipitate indicates, almost invariably, that the organism tested will be useful in my invention. I have been able to isolate a variety of useful fungi, bacteria and yeasts in this manner, examples of which include *Aspergillus fumigatus* NRRL 1986, *Aspergillus fumigatus* No. 12, *Paecylomyces varioti* NRRL 1282, *Penicillium vermiculatum* NRRL 1009 and *Flavobacterium* sp.

The propagation of a typical organism useful in the present invention is illustrated by *Flavobacterium* sp. which grows rapidly in a buffered salts medium, such as that described above, containing 0.1 percent of sodium trans-$l$-epoxysuccinate. Water washed cell suspensions of this organism rapidly oxidize the epoxy acid producing cell material and carbon dioxide as the only quantitatively significant products.

I have discovered that the conversion of trans-epoxysuccinic acid to meso-tartaric acid by the organisms described above can be accomplished either by the whole cells or by an enzyme extract prepared from the cells. In the first method it is necessary to remove the product meso-tartaric acid from the culture filtrate as it is formed since the organisms used in the conversion attack this acid as well as trans-epoxysuccinic acid. This can be conveniently accomplished by the addition of calcium ions to the filtrate to precipitate calcium meso-tartrate. In the latter case it is not necessary to add calcium ions since the enzyme does not attack the meso-tartrate product. The preparation of an enzyme extract useful for the conversion of trans-epoxysuccinic acid to meso-tartaric acid is illustrated by the following example.

EXAMPLE I.—PREPARATION OF A CELL-FREE ENZYME EXTRACT

A cell-free enzyme preparation was made by drying trans-epoxysuccinate grown cells of *Flavobacterium* sp. over phosphorous pentoxide in a desiccator at 20 mm. of mercury pressure for 4 hours. The dried material was then ground with alumina and extracted with deionized water employing 1 ml. of water per 8 mg. of dried cell materials. The extract was then cleared by centrifuging at 3000 r.p.m. for 15 minutes and tested for activity towards trans-$l$-epoxysuccinic acid. There was no gaseous exchange detectable manometrically in Warburg respirators. A paper chromatogram, however, revealed that a change had taken place; the epoxysuccinic acid spot ($Rf$ 0.75) had disappeared and a new acid spot ($Rf$ 0.29) appeared simultaneously. This transformation was attributed to enzyme action since a control treatment employing boiled enzyme failed to show any change. The chromatographic evidence confirming the enzymatic conversion of trans-$l$-epoxysuccinic acid is summarized in Table II below:

TABLE II

*Enzymatic conversion of trans-l-epoxysuccinic acid*

| | Acid spot at $Rf$ [1] |
|---|---|
| Epoxysuccinic acid | .75 |
| Epoxysuccinic acid plus boiled enzyme | .75 |
| Epoxysuccinic acid plus fresh enzyme | .29 |
| $d$-Tartaric acid | .31 |

[1] Solvent system: Ethyl ether-formic acid-water (16/1/1 volumes).

The Rƒ values of the acid formed by the enzymatic conversion described above were measured in three different solvent systems. In each case the acid behaved similarly but not identically as $d$-tartaric acid controls run simultaneously. The enzyme-formed acid also gave a positive ferric chloride test for an alpha-hydroxy acid. Therefore, since no gaseous change accompanied the enzymatic conversion of the epoxy acid, it was assumed that the product was tartaric acid.

The correctness of this assumption was demonstrated by the isolation and identification of meso-tartaric acid as the product of the enzymatic conversion described in the following example.

EXAMPLE II.—ENZYMATIC CONVERSION OF TRANS-EPOXYSUCCINIC ACID TO MESO-TARTARIC ACID

A cell-free enzyme solution (54 ml.) was prepared as described in Example I from 432 mg. of dried Flavobacterium cells. Sodium trans-$l$-epoxysuccinate (350 mg.) was added and the mixture incubated for 3 hours at about 30° C. A chromatogram made at the end of this period showed complete disappearance of the epoxy acid and the formation of a new acid. The reaction mixture was passed through an ion exchange column (Dowex 50) to remove cations and the column was washed with water until the effluent was no longer acid to litmus. The combined effluents were evaporated to dryness and the residue taken up in a few ml. of water. The organic acid was purified by partion chromatography using a silic acid column with 50 percent n-butanol in chloroform (volume/volume) as the mobile phase. Spot tests with indicator made on the effluent fractions revealed a single acid peak at about 400 ml. of effluent. The fractions containing the acid product were combined and the solvent removed by evaporation. The residue was refluxed in a large volume of ether for 2 hours and the solution filtered. An equal volume of toluene was added to the clear ether solution, which was then allowed to stand. Crystalline material was obtained in 3 to 4 days at room temperature. Re-crystallization was effected several times in the same manner until a constant melting point was obtained. The crystalline acid melted between 139 and 140° C. (block). An authentic specimen of meso-tartaric acid melted at 140° C. The mixed melting point of the conversion product and the known meso-tartaric acid was 139–141° C. The pure acid product was optically inactive in aqueous solution. The crystalline acid analyzed as follows:

|   | Found, percent | Theory for Tartaric Acid, percent |
|---|---|---|
| C | 31.41 | 32.00 |
| H | 4.26 | 4.00 |

A crystalline calcium salt of the meso-tartaric acid prepared above was made by adding calcium chloride to neutralized solution and allowing it to stand. The resulting salt was recrystallized several times by dissolving it in 1 N HCl followed by neutralization of the solution. A sample of authentic calcium meso-tartarate (Eastman-Kodak) was treated and purified in an identical manner. X-ray diffraction patterns run on the unknown acid and the known calcium meso-tartarate revealed them to be identical as shown in Table III below. The product of the enzymatic conversion of trans-$l$-epoxysuccinic acid, therefore, was definitely established to be meso-tartaric acid.

TABLE III

Xray diffraction patterns of crystalline calcium salts of authentic meso-tartaric acid and of the product of enzymatic conversion of trans-epoxysuccinate

| Authentic Meso-Tartaric Acid | | Enzyme Product | |
|---|---|---|---|
| A.° | $I/I_0$ | A.* | $I/I_0$ |
| 9.01 | .3 | 9.01 | .4 |
| 7.13 | .2 | 7.18 | .2 |
| 6.51 | .1 | 6.55 | .1 |
| ----- | ----- | 5.53 | .2 |
| 5.03 | 1.0 | 5.03 | 1.0 |
| 4.57 | .4 | 4.57 | .4 |
| 3.89 | .2 | 3.91 | .2 |
| 3.75 | .2 | 3.75 | .2 |
| 3.57 | .4 | 3.51 | .4 |
| 3.24 | .4 | 3.24 | .3 |
| 3.04 | .3 | 3.04 | .2 |
| 2.72 | .2 | 2.74 | .2 |
|  |  | 2.66 | .2 |
| 2.57 | .2 | 2.58 | .2 |
| 2.35 | .2 | 2.34 | .2 |
| 1.11 | .3 | 2.12 | .3 |

*Distance between crystalline planes.
Relative intensity of diffractive lines with respect to line at 5.03A.

The cell-free enzyme extract described above in Examples I and II was tested for specificity with respect to the geometric and optical isomers of epoxysuccinic acid. Solutions of the enzyme acted on the synthetic racemic trans mixture equally as well as on the $l$-antipode, showing that both the $d$- and the $l$-antipodes were hydrolyzed. Synthetic cis-epoxysuccinic acid prepared as described in the literature was not affected by the enzyme.

Cell-free preparations containing the above enzyme, which I call trans-succinicepoxide hydrolase, were dialyzed against a large excess of deionized water for 18 hours at 5° C. The dialyzed residue had epoxide hydrolase activity equal to an undialyzed control run parallel with the dailyzed material. In both cases 36 mg. of trans-$l$-epoxysuccinate were completely converted to meso-tartarate in three hours by 6 ml. of enzyme solution.

Washed cells of Flavobacterium sp. harvested from trans-$l$-epoxysuccinate medium were tested in Warburg respirometers for their ability to oxidatively attack the various isomers of epoxysuccinic and tartaric acids. The whole cells, like the enzyme extracts, were active in oxidizing the synthetic trans $dl$-mixture and natural trans-$l$-epoxysuccinic acid. They were also observed to attack meso-tartarate at approximately the same rate at which they attack the epoxy acid. Neither $d$- nor $l$-tartarate, however, was oxidized by whole cells under the test conditions. The discovery that epoxy acid-grown cells are simultaneously adapted to utilize only the meso-tartrate isomer, together with the behavior of cell-free enzymes noted above, indicates that living cells oxidize trans-$l$-epoxysuccinic acid via meso-tartaric acid under normal conditions. Whole cell cultures of numerous other organisms utilizing trans-epoxysuccinate failed to reveal the presence of meso-tartaric acid in every case indicating the necessity, under these conditions, for removing the meso acid as it is formed in order to accomplish the purpose of my invention.

EXAMPLE III.—RECOVERY OF CALCIUM MESO-TARTRATE FROM WHOLE CELL SUSPENSIONS

A washed cell suspension of Flavobacterium was prepared as above utilizing about 0.1 percent of sodium trans-$dl$-epoxysuccinate in the medium and approximately the molar equivalent of calcium chloride. As the conversion progressed crystalline calcium meso-tartrate was deposited. A series of experiments was conducted in this manner utilizing other organisms, including those specifically described above. It was found that crystalline calcium meso-tartrate was obtained in every case in from about half a day to five days depending upon the culture. Yields were good; in one bacterial suspension, for example, a yield of 70 percent was obtained, based on the molar conversion of trans-epoxysuccinate. A certain amount of calcium carbonate was produced in these conversions, as revealed by the evolution of carbon dioxide upon acidification of the filtrates. Crystalline product from each of the cultures prepared was used to obtain $Rf$ values on paper chromatograms in three different solvent systems. The resulting data appear in Table IV below.

TABLE IV

*$Rf$ values of calcium precipitated culture products compared with authentic calcium meso-tartrate*

| Solvent System | Culture Precipitate | Authentic Meso-Tartrate |
|---|---|---|
| A [1] | 0.28 | 0.28 |
| B [2] | 0.35 | 0.35 |
| C [3] | 0.50 | 0.50 |

[1] Ether-formic acid-water 16/1/1 volumes.
[2] n-Butanol-acetic acid-water 4/1/1 volumes.
[3] Ethanol (95%)-formic acid 8/1 volumes.

X-ray diffraction patterns of the calcium precipitated culture products described above were identical with those of authentic calcium meso-tartrate; the data being virtually identical with that in Table III. It was observed that $d$-tartrate had the same $Rf$ value as meso-tartrate in the butanol-acetic acid-water and ethanol-formic acid solvent systems. In the ether-formic acid-water system, however, $d$-tartrate can be distinguished from meso-tartrate since it has an $Rf$ value of 0.31 as opposed to 0.29 for the meso compound. Cf. Table II.

In the work described above, molecular weights were determined by boiling point elevation, using a procedure adapted from the method of Belcher and Godberg, "Semimicro Quantitative Organic Analyses," pp. 134–136, Longmans Green and Co., N.Y., N.Y. (1944). Acetone was used as a solvent. Equivalent weights were determined by potentiometric titration with standard alkali. X-ray diffraction patterns were obtained on a Norelco 180° X-ray diffractometer.

Paper chromatographs were developed, except as otherwise noted, with the rapid ascending ether solvent systems of Denison and Phares, "Rapid Method for Paper Chromatography of Organic Acids," Anal. Chem., 24, 1628–1629 (1952). Acids were revealed as yellow spots after spraying the dry papers with 0.04 percent from cresol green solution. As little as 5 micrograms of epoxysuccinic acid can be detected in this manner.

The specific examples given above are merely illustrative and are not be construed as limiting the scope of my invention either as to the organism capable of converting trans-epoxysuccinic acid to meso-tartaric acid or as to other details of the described methods, equivalents of which will occur to those skilled in the art.

I claim:

1. A process for the production of calcium meso-tartrate which comprises fermenting an aqueous medium containing trans-epoxysuccinic acid and a stoichiometric excess of calcium ions by means of an organism of the subphylum Fungi selected from the group consisting of *Aspergillus fumigatus*, *Paecilomyces varioti* and *Penicillium vermiculatum*, and recovering precipitated crystalline calcium meso-tartrate from the aqueous medium.

2. The process for the enzymatic conversion of trans-epoxysuccinic acid to meso-tartaric acid that comprises treating an aqueous medium containing trans-epoxysuccinic acid with a cell-free extract of the enzyme trans-succinicepoxide hydrolase.

3. The process for enzymatically converting trans-epoxysuccinic acid to meso-tartaric acid that comprises treating an aqueous medium containing trans-epoxysuccinic acid with a cell-free extract of the enzyme trans-succinicepoxide hydrolase obtained from the cells of an organism selected from the group consisting of *Aspergillus fumigatus*, *Paecilomyces varioti* and *Penicillium vermiculatum*.

4. The process for the enzymatic conversion of trans-epoxysuccinic acid to meso-tartaric acid that comprises treating an aqueous medium containing trans-epoxysuccinic acid and a stoichiometric excess of calcium ions with the enzyme trans-succinicepoxide hydrolase.

No references cited.